US010929354B2

(12) United States Patent
Lee et al.

(10) Patent No.: US 10,929,354 B2
(45) Date of Patent: Feb. 23, 2021

(54) METADATA SERVER AND METHOD FOR DISTRIBUTING METADATA IN DIRECTORIES USING THE SAME

(71) Applicant: ELECTRONICS AND TELECOMMUNICATIONS RESEARCH INSTITUTE, Daejeon (KR)

(72) Inventors: Sang-Min Lee, Daejeon (KR); Young-Kyun Kim, Daejeon (KR); Hong-Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 362 days.

(21) Appl. No.: 15/941,962

(22) Filed: Mar. 30, 2018

(65) Prior Publication Data
US 2018/0322142 A1 Nov. 8, 2018

(30) Foreign Application Priority Data

May 2, 2017 (KR) .......................... 10-2017-0056552

(51) Int. Cl.
*G06F 7/02* (2006.01)
*G06F 16/00* (2019.01)
(Continued)

(52) U.S. Cl.
CPC .......... *G06F 16/183* (2019.01); *G06F 16/148* (2019.01); *G06F 16/162* (2019.01)

(58) Field of Classification Search
CPC .... G06F 16/183; G06F 16/162; G06F 16/148; G06F 3/067; G06F 3/0604
See application file for complete search history.

(56) References Cited

U.S. PATENT DOCUMENTS 8,606,759 B2   12/2013  Cha et al.
8,898,206 B1 * 11/2014  Jiang .................... G06F 16/164
                                                    707/822
(Continued)

FOREIGN PATENT DOCUMENTS

KR   10-0911058 B1   8/2009
KR   10-1371202 B1   3/2014
KR   10-1453425 B1   10/2014

OTHER PUBLICATIONS

S. A. Weil, K. T. Pollack, S. A. Brandt and E. L. Miller, "Dynamic Metadata Management for Petabyte-Scale File Systems," SC '04: Proceedings of the 2004 ACM/IEEE Conference on Supercomputing, Pittsburgh, PA, USA, 2004, pp. 4-4, doi: 10.1109/SC.2004.22. (Year: 2004).*

(Continued)

*Primary Examiner* — Bruce M Moser

(57) ABSTRACT

Disclosed herein are a metadata server and a method for distributing metadata in units of directories using the metadata server. The method includes receiving a request for at least one of creation, deletion and retrieval from a user file system; acquiring an inode corresponding to an identifier of a parent inode, which is included in the request; searching the parent inode for a dentry corresponding to the request when the request is a request to create a directory; selecting a secondary metadata server in which a new directory is to be created in order to distribute metadata in units of directories; requesting the selected secondary metadata server to create an inode; receiving an identifier of the created inode from the secondary metadata server; and adding a new dentry to the parent inode using the identifier of the inode.

20 Claims, 12 Drawing Sheets

(51) Int. Cl.
*G06F 16/182* (2019.01)
*G06F 16/14* (2019.01)
*G06F 16/16* (2019.01)

(56) References Cited

U.S. PATENT DOCUMENTS

| | | |
|---|---|---|
| 2009/0138444 A1 | 5/2009 | Kim et al. |
| 2010/0161657 A1 | 6/2010 | Cha et al. |
| 2012/0101991 A1 | 4/2012 | Srivas et al. |
| 2014/0006465 A1* | 1/2014 | Davis .................. G06F 16/183 707/827 |
| 2016/0274980 A1 | 9/2016 | Kim et al. |

OTHER PUBLICATIONS

J. Xiong, Y. Hu, G. Li, R. Tang and Z. Fan, "Metadata Distribution and Consistency Techniques for Large-Scale Cluster File Systems," in IEEE Transactions on Parallel and Distributed Systems, vol. 22, No. 5, pp. 803-816, May 2011, doi: 10.1109/TPDS.2010.154. (Year: 2011).*

Sanjay Ghemawat et al., "The Google File System", 19th ACM Symposium on Operating Systems Principles, Oct. 2003, pp. 1-15.

Sage A. Weil et al., "Ceph: A Scalable, High-Performance Distributed File System", Proceedings of the 7th Symposium on Operating Systems Design and Implementation, 2006, pp. 307-320, USENIX Association.

* cited by examiner

METADATA SERVER AND METHOD FOR DISTRIBUTING METADATA IN DIRECTORIES USING THE SAME

CROSS REFERENCE TO RELATED APPLICATION

This application claims the benefit of Korean Patent Application No. 10-2017-0056552, filed May 2, 2017, which is hereby incorporated by reference in its entirety into this application.

BACKGROUND OF THE INVENTION

1. Technical Field

The present invention relates generally to technology for securing performance and scalability depending on the number of metadata servers when multiple metadata servers form a cluster in order to support a large-scale distributed file system, and more particularly to technology for distributing metadata in units of directories and gradually flushing blocks by dividing the blocks to be flushed into multiple groups.

2. Description of the Related Art

In order to support mass storage space, file-system structures, such as Google File System (GFS), Hadoop Distributed File System (HDFS), Lustre, and the like, are currently widely used. A file-system structure provides a single file-system image to users by combining a single metadata management server with multiple data servers.

Here, the metadata management server stores and manages only metadata of files, such as file names, times at which the files were created and modified, information about the locations of file data, and the like. The actual data of files are stored in data servers and accessed based on the file data location information acquired from the metadata.

However, this structure has limitations as to performance and storage space because a single metadata server is used. In order to overcome these limitations arising from the use of a single metadata server, clustering of multiple metadata servers has been attempted.

'Gluster' has a structure in which metadata are distributed based on a hashing algorithm, and creates the same directory structure in all servers. When the number of servers increases, hash values must be changed, but because it is difficult to track and manage this, the same directory structure is created in all of the servers. Accordingly, directory storage space may be wasted, and directory-processing performance may be degraded.

Also, in the case of 'Gluster', a request to create, delete, or search for a file is sent to all data servers, rather than being sent only to a corresponding server. Accordingly, file creation and deletion performance is decreased with an increase in the number of data servers.

'Ceph' is configured such that metadata are divided into units of metadata space and stored in metadata servers. Because sub-tree partitioning is performed only after the metadata space is filled up, performance is not improved compared to when a single metadata server is used. Also, when the metadata space is filled up, metadata therein must be migrated to another metadata server, which drastically degrades the performance of the metadata servers.

Accordingly, it is necessary to develop a method for distributing metadata among multiple metadata servers, other than the existing metadata distribution method, in order to efficiently support a large-scale file system.

DOCUMENTS OF RELATED ART (Patent Document 1) Korean Patent No. 10-1371202, published on Feb. 28, 2014 and titled "Distributed file system having multi-MDS architecture and method for processing data using the same".

SUMMARY OF THE INVENTION

An object of the present invention is to secure performance and storage space scalability depending on the number of servers by processing most user requests in a single metadata server.

Another object of the present invention is to achieve ideal performance and scalability by minimizing performance interference between servers.

A further object of the present invention is to reduce the expense of installing a server by securing required performance and storage space with fewer servers than an existing file system.

In order to accomplish the above objects, a method for distributing metadata in units of directories, which is performed by a metadata server, according to the present invention includes receiving a request for at least one of creation, deletion, and retrieval from a user file system; acquiring an inode corresponding to an identifier of a parent inode, which is included in the request; when the request is a request to create a directory, searching the parent inode for a dentry (directory entry) corresponding to the request; selecting a secondary metadata server to which a new directory is to be assigned in order to distribute metadata in units of directories; requesting the selected secondary metadata server to create an inode therein; receiving an identifier of the created inode from the secondary metadata server; and adding a new dentry to the parent inode using the identifier of the inode.

Here, the method may further include acquiring an address of the secondary metadata server and the identifier of the inode from dentry information corresponding to the request when the request is not a request to create a directory.

Here, when the request is a request to delete a directory, the method may further include requesting the secondary metadata server to delete the inode; and deleting corresponding dentry information from the parent inode.

Here, when the request is a request to search for a directory, the method may further include requesting information about the inode from the secondary metadata server and receiving the information about the inode from the secondary metadata server.

Here, when the request is a request for at least one of creation, deletion, and retrieval of a file, the method may further include searching the parent inode for a dentry corresponding to the request.

Here, when the request is a request to create a file, the method may further include searching the parent inode for the dentry corresponding to the request; when the dentry is not found, creating a new inode; and adding a new dentry to the parent inode using an identifier of the new inode;

Here, when the request is a request to delete a file and when the dentry is found, the method may further include acquiring an inode corresponding to the dentry; deleting the inode corresponding to the request; and deleting the corresponding dentry from the parent inode.

Here, when the request is a request to search for a file and when the dentry is found, the method may further include acquiring an inode corresponding to the dentry; and acquiring information about the inode corresponding to the dentry.

Here, the method may further include determining whether the parent inode is present after acquiring the inode; and sending a failure message to the user file system when it is determined that the parent inode is not present.

Here, the method may further include sending a failure message to the user file system when the dentry is found.

Here, the request may be in regard to a file or a directory, and may include at least one of a command, the identifier of the parent inode, and a file name.

Here, at least one of the metadata server and the secondary metadata server searches for a block corresponding to a user request using a block structure including a block index field, a lock field, a dirty field, a dirty start time field, and a block data field.

Here, the method may further include grouping all blocks to be flushed into multiple groups and gradually flushing the blocks.

Here, flushing the blocks may be configured to perform flushing after grouping the blocks based on a maximum number of blocks to be included in each group or based on a distance between blocks.

Here, flushing the blocks may be configured to repeatedly perform extracting the dirty blocks one by one from a dirty head to which the dirty blocks are connected, removing the extracted block from the dirty head and adding the removed block to a write head, and waiting for a preset time until the blocks included in the write head are flushed.

Also, a metadata server according to an embodiment of the present invention includes a request reception unit for receiving a request for at least one of creation, deletion, and retrieval from a user file system; an inode acquisition unit for acquiring an inode corresponding to an identifier of a parent inode, which is included in the request; a request analysis unit for determining whether the request is in regard to a file or a directory; a metadata distribution unit for searching for a dentry corresponding to the request, creating a new inode or searching for or deleting an inode corresponding to the dentry when the request is in regard to a file, and processing the request using a secondary metadata server to which metadata are distributed in units of directories when the request is in regard to a directory; and a directory management unit for adding a new dentry to the parent inode or deleting the inode corresponding to the dentry from the parent inode based on a result of processing the request.

Here, the metadata distribution unit may be configured to add the new dentry to the parent inode corresponding to the request or search for or delete the inode corresponding to the request when the request is a request for any one of creation, deletion, and retrieval of a file.

Here, the metadata distribution unit may be configured to create an inode in the secondary metadata server or retrieve or delete an inode from the secondary metadata server so as to respond to the request when the request is a request for any one of creation, deletion, and retrieval of a directory.

Also, a metadata server according to another embodiment of the present invention includes a block search unit for searching for a block corresponding to a user request using a block structure including a block index field, a lock field, a dirty field, a dirty start time field, and a block data field; a grouping unit for grouping all blocks to be flushed based on at least one of a maximum number of blocks to be included in each group and a distance between blocks; and a flushing unit for gradually flushing the grouped blocks.

Here, the flushing unit may repeatedly perform extracting the dirty blocks one by one from a dirty head to which the dirty blocks are connected, removing the extracted block from the dirty head, adding the removed block to a write head, and waiting for a preset time until the blocks included in the write head are flushed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
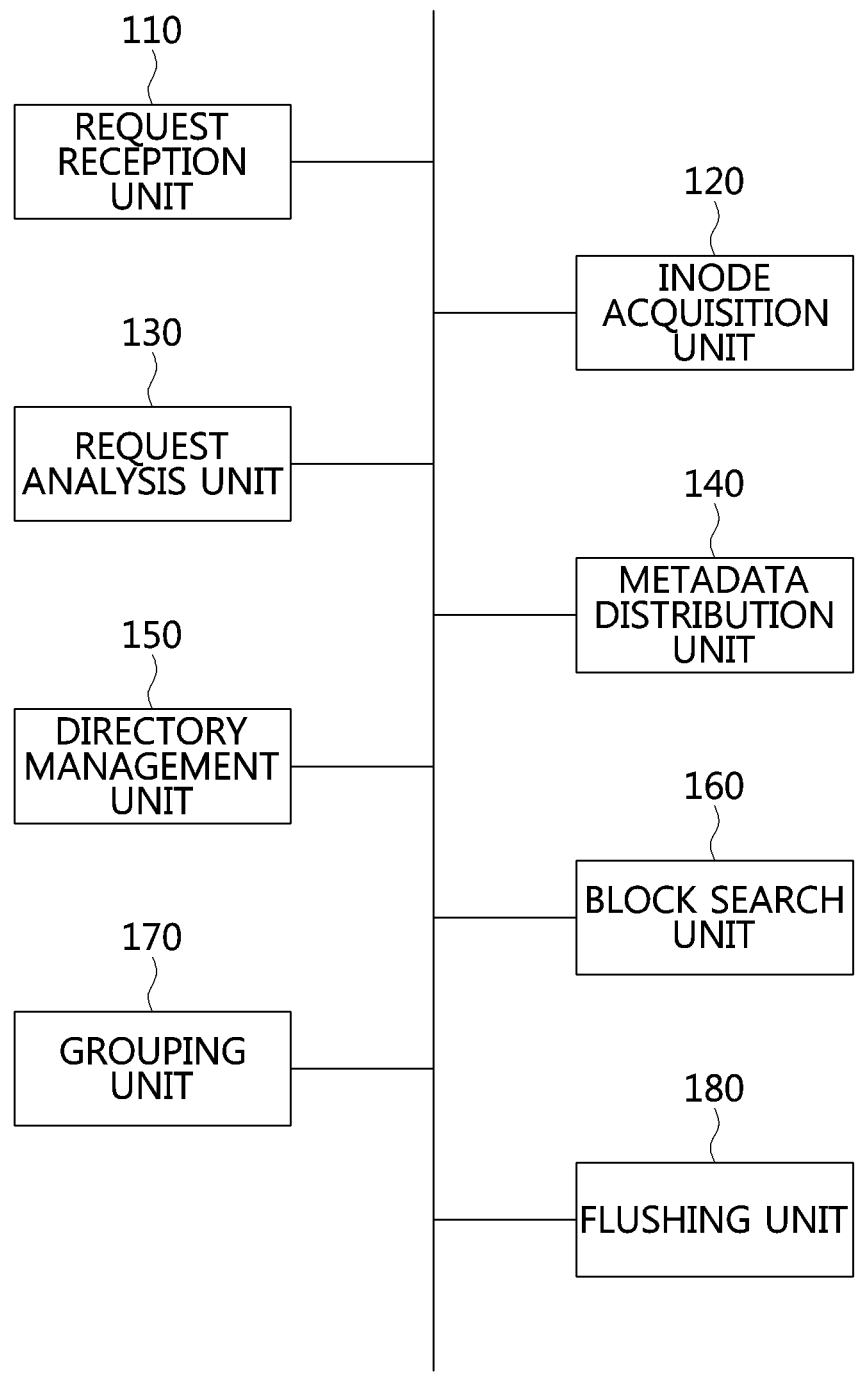
FIG. 1 is a block diagram that shows the configuration of a metadata server according to an embodiment of the present invention.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

The performance (P) of a cluster of metadata servers may be represented as the product of the performance (p) of a single metadata server, the number (N) of metadata servers in the cluster, and r. Here, r has a value that is greater than 0 and equal to or less than 1, and as the value of r approaches 1, it is increasingly probable that ideal performance is achieved.

Similarly, the storage (S) of the cluster of metadata servers may be represented as the product of r', the number (N) of metadata servers in the cluster, and the size (s) of the storage of a single metadata server. Here, as the value of r', which is greater than 0 and equal to or less than 1, approaches 1, it is increasingly probable that ideal performance associated with storage space is achieved.

When a metadata clustering method according to the conventional art is used, it is difficult to achieve ideal metadata performance. Because multiple metadata servers participate in processing of a single piece of metadata, the performance of the cluster of the metadata servers is degraded. Also, because the size of the units into which metadata are divided is too large, metadata are not distributed evenly to the multiple metadata servers.

In a large-scale file system, users make more requests for creation and searches than requests for deletion, and file creation operations are more frequently required than directory creation operations. Also, all files in a large-scale file system are stored and managed in units of directories. Accordingly, a metadata server according to an embodiment of the present invention distributes metadata in units of directories in order to realize ideal performance and to secure the ideal amount of storage space.

Therefore, the metadata server according to an embodiment of the present invention processes metadata operations, such as retrieval, creation and deletion of a file, which correspond to most user requests, in a single metadata server, whereby the performance (P)=N*p may be realized.

Also, the metadata server forwards operations, such as retrieval, creation and deletion of a directory, to two metadata servers (a metadata server and another metadata server for distribution), whereby the performance (P)=r*N*p (0.5≤r<1) may be realized. Also, because metadata are distributed in units of directories, metadata may be evenly distributed to multiple metadata servers.

Meanwhile, even if a metadata server distributes metadata in units of directories, the performance of a cluster of metadata servers is degraded with an increase in the number of metadata servers. When a single metadata server is used, the file creation performance thereof is maintained consistent at a level at which about 5,000 files can be processed per unit time, except for some short intervals.

When the metadata server distributes metadata in units of directories among eight metadata servers, the highest file creation performance may reach a level at which about 8*5000 (N*p) files can be processed per unit time, but the highest performance is not continuously maintained, and an interval during which performance drastically decreases frequently appears. In order to resolve this performance issue, the metadata server according to an embodiment of the present invention divides blocks to be flushed into multiple groups, and may thereby gradually flush the blocks.

Hereinafter, the configuration of a metadata server according to an embodiment of the present invention will be described in detail with reference to FIG. 1.

FIG. 1 is a block diagram that shows the configuration of a metadata server according to an embodiment of the present invention.

As shown in FIG. 1, a metadata server 100 may include a request reception unit 110, an inode acquisition unit 120, a request analysis unit 130, a metadata distribution unit 140, a directory management unit 150, a block search unit 160, a grouping unit 170, and a flushing unit 180.

The request reception unit 110, the inode acquisition unit 120, the request analysis unit 130, the metadata distribution unit 140, and the directory management unit 150 function to distribute metadata in units of directories when a cluster of metadata servers is constructed. Also, the block search unit 160, the grouping unit 170, and the flushing unit 180 divide blocks to be flushed into groups in the metadata server 100 and gradually flush the blocks.

The request reception unit 110 receives a request for at least one of creation, deletion, and retrieval from a user file system. Here, the request may be in regard to a file or a directory, and may include at least one of a command, the identifier of a parent inode, and a file name.

The inode acquisition unit 120 acquires an inode corresponding to the identifier of a parent inode, which is included in the request.

The request analysis unit 130 determines whether the request is in regard to a file or a directory.

For the convenience of description, the request analysis unit 130 has been described as determining whether the request is in regard to a file or a directory, but it may determine whether the request corresponds to the creation of a file, deletion of a file, retrieval of a file, creation of a directory, deletion of a directory, or retrieval of a directory.

The metadata distribution unit 140 searches for a dentry (directory entry) corresponding to the request, and creates a new inode or searches for or deletes an inode corresponding to the dentry when the request is in regard to a file. However, when the request is in regard to a directory, the request is processed using a secondary metadata server to which metadata are distributed in units of directories.

Also, when the request corresponds to any one of creation, deletion and retrieval of a file, the metadata distribution unit 140 may add a new dentry in the parent inode corresponding to the request, or may search for or delete the inode corresponding to the request.

Also, when the request corresponds to any one of creation, deletion and retrieval of a directory, the metadata distribution unit 140 may create an inode in a secondary metadata server or retrieve or delete the inode from the secondary metadata server so as to respond to the request.

The directory management unit 150 adds a new dentry in the parent inode or deletes the inode corresponding to the dentry from the parent inode based on the result of processing of the request.

The block search unit 160 searches for a block corresponding to a user's request using a block structure. Here, the block structure may include a block index field, a lock field, a dirty field, a dirty start time field, and a block data field.

The grouping unit 170 groups all of the blocks to be flushed based on the maximum number of blocks that can be included in each group or the distance between blocks.

The flushing unit 180 gradually flushes grouped blocks.

For the convenience of description, the metadata server 100 has been described as including all of the request reception unit 110, the inode acquisition unit 120, the request analysis unit 130, the metadata distribution unit 140, the directory management unit 150, the block search unit 160, the grouping unit 170, and the flushing unit 180.

However, without limitation thereto, the metadata server 100 may be configured with some of the above-mentioned units in order to function to distribute metadata in units of directories or in order to divide blocks to be flushed into groups and gradually flush the grouped blocks.

Hereinafter, a method in which a metadata server processes a request according to an embodiment of the present invention will be described in detail with reference to FIG. 2 and FIG. 3.

Figure 2:
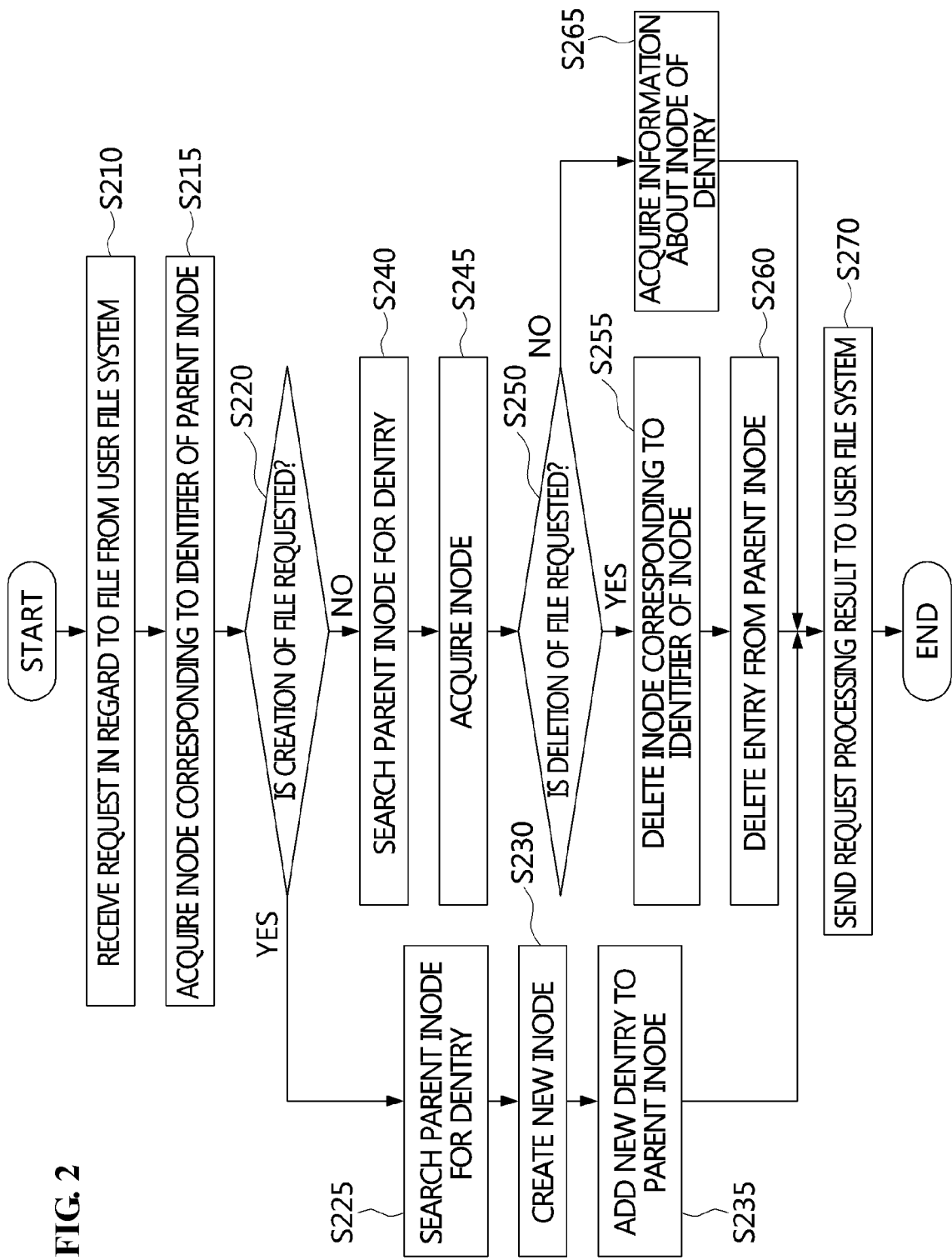
FIG. 2 is a flowchart for explaining a method for processing a file-related request in a metadata server according to an embodiment of the present invention.

FIG. 2 is a flowchart for explaining a method for processing a file-related request in a metadata server according to an embodiment of the present invention.

First, a metadata server 100 receives a file-related request from a user file system at step S210.

Here, the file-related request is a request for any one of creation, retrieval and deletion of a file, and includes a command (create, search, or delete), the identifier of a parent inode, and a file name.

The metadata server 100 is a metadata server including the parent directory of the file corresponding to the request.

The metadata server 100, which receives the file-related request, acquires an inode corresponding to the identifier of the parent inode at step S215.

Here, when the parent inode is not present, the metadata server 100 may create a file-related request processing failure message and send the same to the user file system.

The metadata server 100 determines at step S220 whether the request received at step S210 is a request to create a file, and searches the parent inode for a dentry at step S225 when it is determined that the received request is a request to create a file.

When it is determined that the request is a request to create a file, the metadata server 100 searches the parent inode for a dentry corresponding to the file name. When the dentry is found, the metadata server 100 may create a file-related request processing failure message and send the same to the user file system.

Conversely, when the dentry is not found, the metadata server 100 creates a new inode at step S230, and adds a new dentry for the inode in the parent inode at step S235.

Also, when it is determined at step S220 that the request is not a request to create a file, the metadata server 100 searches the parent inode for a dentry at step S240 and acquires the inode corresponding to the dentry at step S245.

The metadata server 100 searches the parent inode for the dentry corresponding to the file name. When the dentry is not found, the metadata server 100 may create a file-related request processing failure message and send the same to the user file system. When the dentry is found, the metadata server 100 may acquire an inode corresponding to the dentry.

When the request is a request to delete a file (yes' at step S250), the metadata server 100 deletes the inode corresponding to the inode identifier at step S255 and deletes the entry corresponding to the file name from the parent inode at step S260.

Meanwhile, when the request is a request to search for a file (no' at step S250), the metadata server 100 acquires information about the inode corresponding to the dentry.

After step S235, S260, or S265 is performed, the metadata server 100 sends the result of processing the request to the user file system at step S270.

The metadata server 100 may create a file-related request processing success message or a file-related request processing failure message and send the created message to the user file system.

Figure 3:
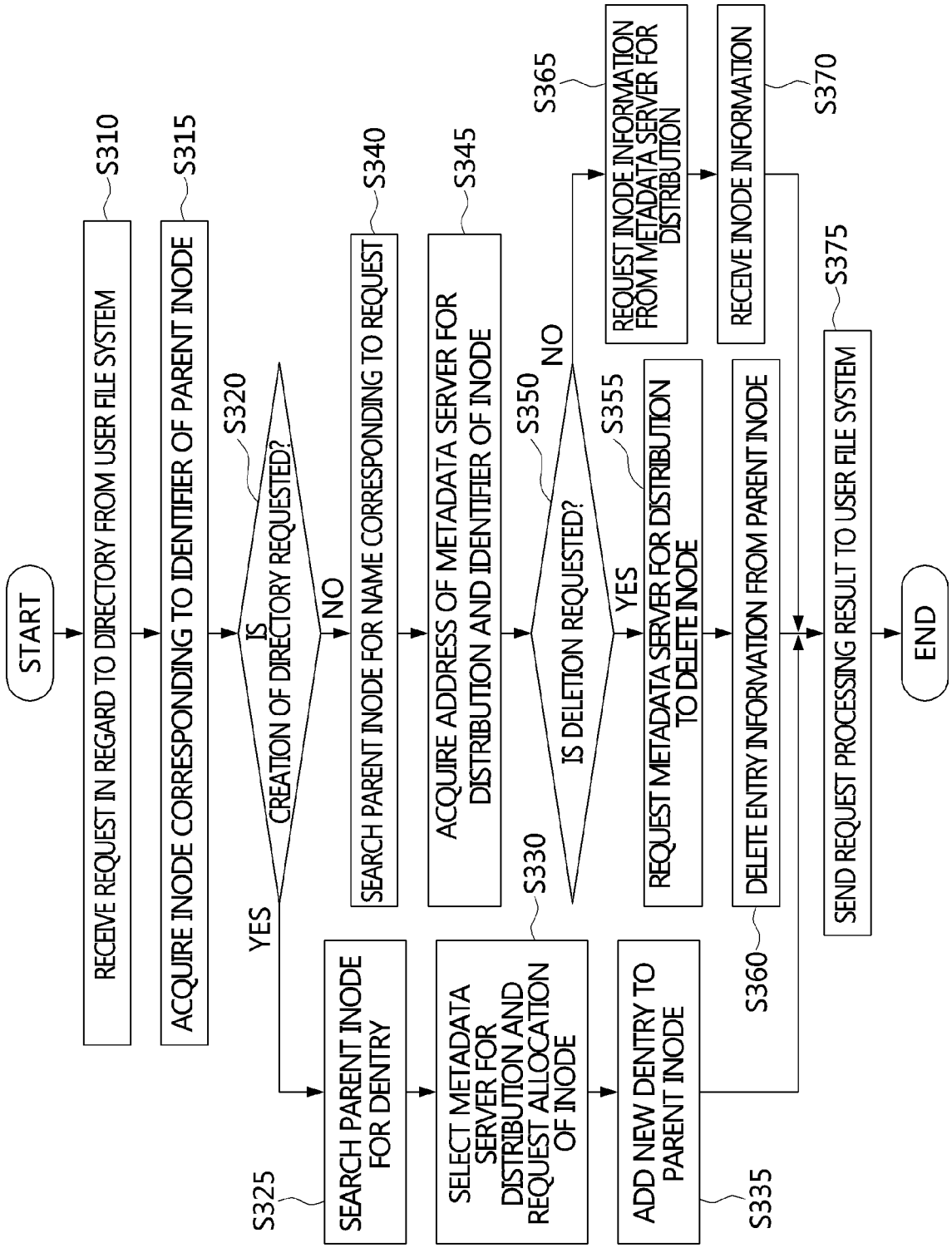
FIG. 3 is a flowchart for explaining a method for processing a directory-related request in a metadata server according to an embodiment of the present invention.

FIG. 3 is a flowchart for explaining a method for processing a directory-related request in a metadata server according to an embodiment of the present invention.

First, the metadata server 100 receives a directory-related request from a user file system at step S310.

Here, the directory-related request is a request for any one of creation, retrieval, and deletion of a directory, and may include a command (create, search, or delete), the identifier of a parent inode, and a directory name.

The user file system that sends the directory-related request acquires the address of a metadata server using the identifier of the parent inode included in the directory-related request, and may send the directory-related request to the metadata server 100 corresponding to the acquired address of the metadata server.

The metadata server 100 acquires an inode corresponding to the identifier of the parent inode at step S315.

Steps S310 and S315 may, in practice, be the same as steps S210 and S215 in FIG. 2, and a repeated description will be omitted.

The metadata server 100 determines whether the request is a request to create a directory at step S320. When it is determined that the request is a request to create a directory, the metadata server 100 searches the parent inode for a dentry corresponding to the directory name at step S325.

Here, when the dentry is found, the metadata server 100 may create a directory-related request processing failure message and send the same to the user file system.

When the dentry is not found, the metadata server 100 selects an additional metadata server for distribution and requests the additional metadata server to create an inode at step S330.

Here, the additional metadata server for distribution is a metadata server in which a new directory is to be assigned. The additional metadata server for distribution creates a new inode and sets an empty directory. Then, the additional metadata server for distribution sends the identifier of the created inode to the metadata server 100.

The metadata server 100 adds a new dentry for the created inode to the parent inode at step S335.

The metadata server 100 may add the new dentry to the parent inode using the identifier of the created inode, which is received from the additional metadata server for distribution.

Meanwhile, when the request is not a request to create a directory, the metadata server 100 searches the parent inode for the directory name corresponding to the request at step S340 and acquires the address of an additional metadata server for distribution and the identifier of the inode at step S345.

When the dentry corresponding to the directory name is not found at step S340, the metadata server 100 may create a directory-related request processing failure message and send the same to the user file system. Conversely, when the dentry is found, the metadata server 100 may acquire the address of the additional metadata server for distribution and the identifier of the inode from the dentry corresponding to the directory name.

Also, the metadata server 100 determines whether the request is a request to delete a directory at step S350. When it is determined that the request is a request to delete a directory, the metadata server 100 requests the additional metadata server for distribution to delete the inode at step S355. Also, the metadata server 100 deletes the dentry corresponding to the inode from the parent inode at step S360.

Here, the additional metadata server for distribution, to which the request to delete the inode was made, may delete the inode.

Meanwhile, when it is determined that the request is a request to search for a directory ('no' at step S350), the metadata server 100 requests information about the inode from the additional metadata server for distribution at step S365 and receives the information about the inode therefrom at step S370.

Finally, the metadata server 100 sends the result of processing the request to the user file system at step S375.

The metadata server may send the result of processing any one of the creation, deletion, and retrieval of a directory to the user file system after performing any one of steps S335, S360, and S370.

Figure 4:
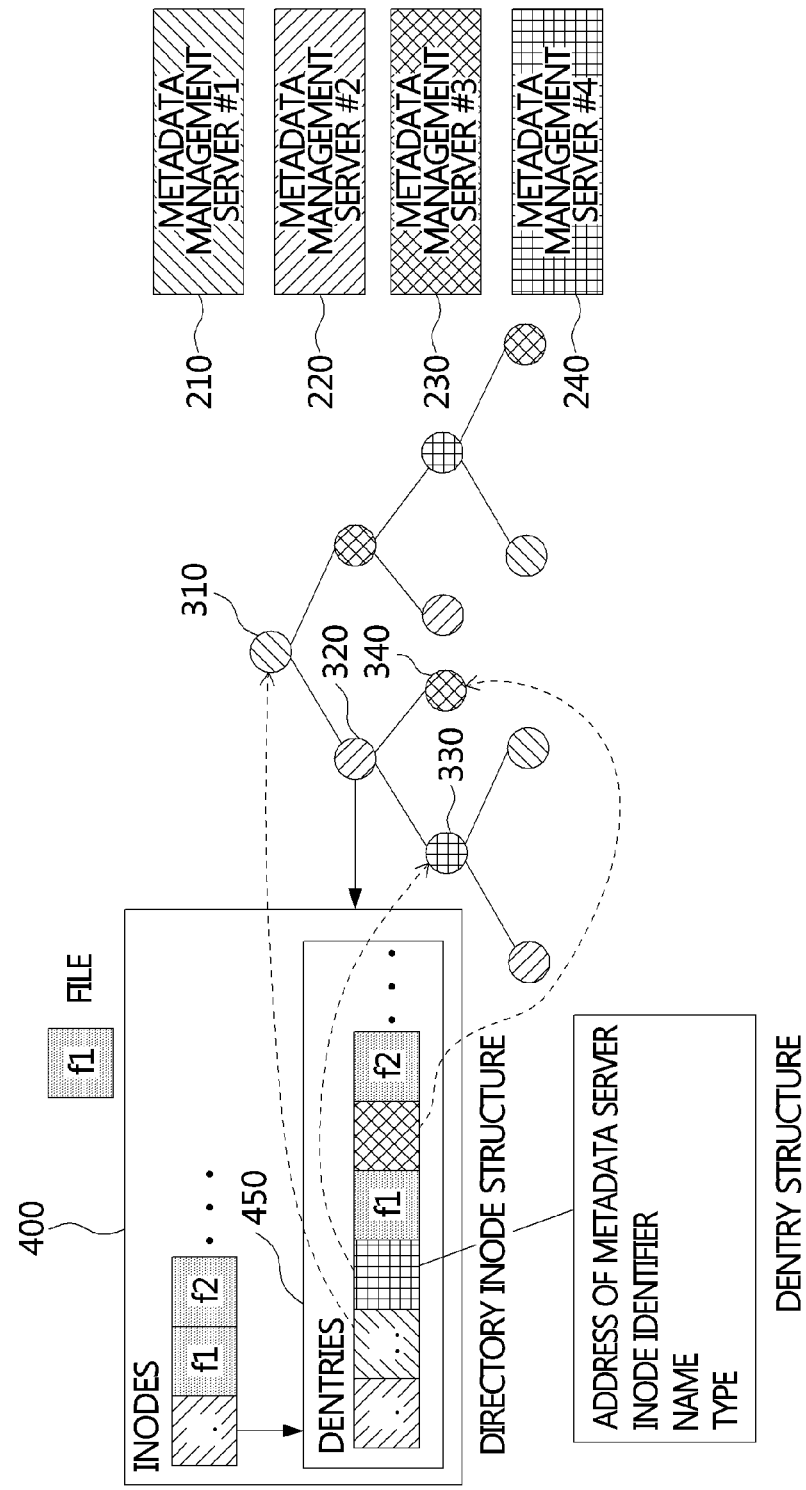
FIG. 4 is a view for explaining the distribution of metadata in units of directories according to an embodiment of the present invention.

FIG. 4 is a view for explaining the distribution of metadata in units of directories according to an embodiment of the present invention.

As illustrated in FIG. 4, a metadata server distributes metadata in units of directory inodes among metadata servers 210 to 240. The structure 400 of a directory inode shown in FIG. 4 is the same as the structure of a general directory inode, but a metadata server address field may be further added to a dentry in order to represent the location of the metadata server in which the corresponding directory is stored.

Unlike directories distributed among multiple metadata servers, dentries (files, symbolic links, and the like) are stored and managed in the metadata server in which the parent directory is located. Accordingly, most operations requested by users, such as file creation, file retrieval, and the like, may be performed in a single metadata server.

For example, the parent directory 310 of the directory inode 320 stored in the second metadata server 220 is located in the first metadata server 210, and the child directories 330 and 340 thereof are located respectively in the fourth data server 240 and the third data server 230. Also, the structure 400 of the directory inode 320 may include multiple dentries 450.

Figure 5:
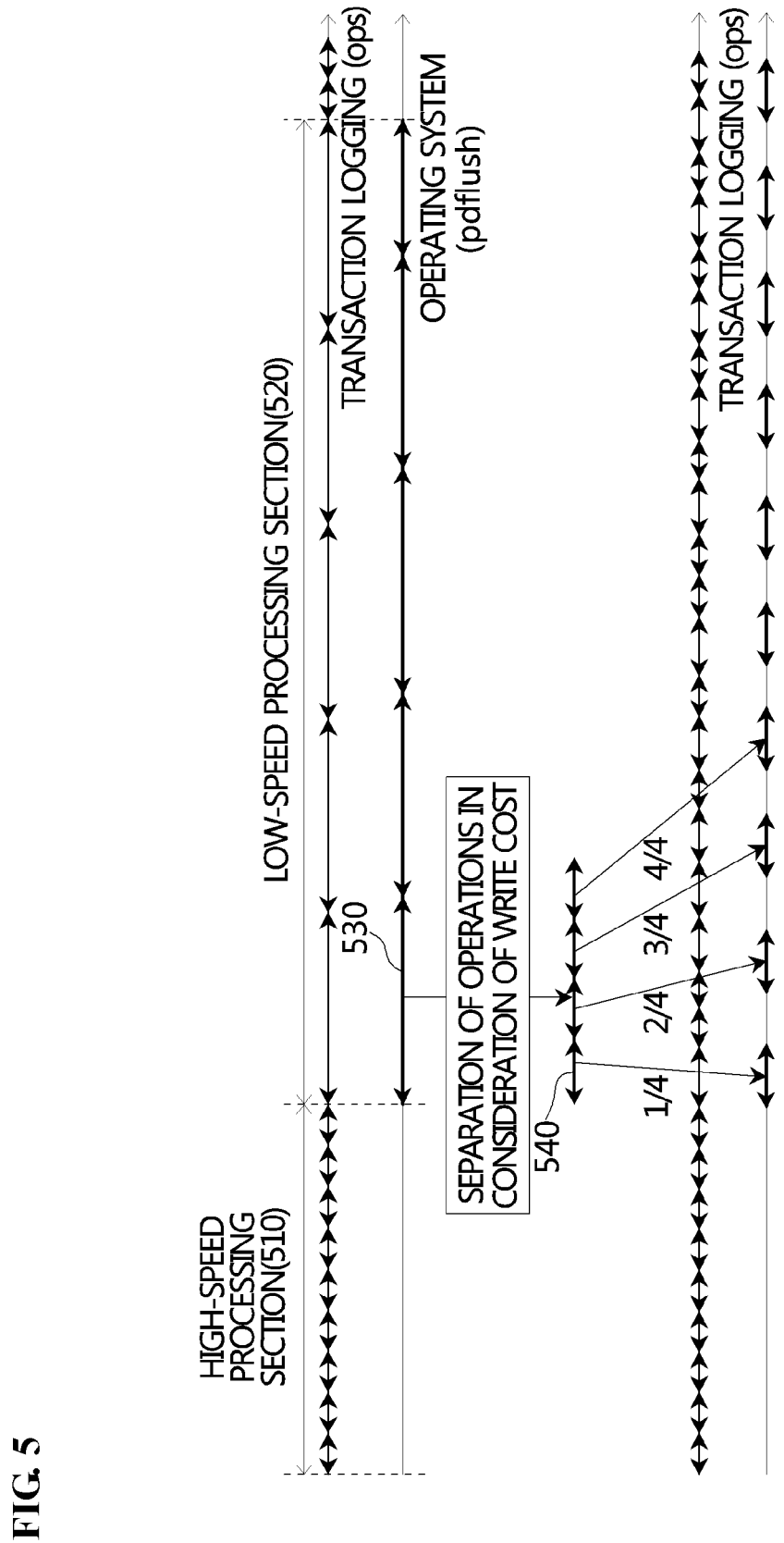
FIG. 5 is a view that shows a method for resolving interference between servers according to an embodiment of the present invention.

FIG. 5 is a view that shows a method for resolving interference between servers according to an embodiment of the present invention.

As illustrated in FIG. 5, in an existing metadata server, a high-speed processing section 510 and a low-speed processing section 520 appear depending on performance.

The low-speed processing section 520 appears because pdflush of the operating system flushes too many dirty pages (writes too many blocks to disk) at once. When a low-speed processing section 520 appears in any one of multiple metadata servers, all requests from users wait for the result of processing by the corresponding metadata server.

Accordingly, the metadata server 100 according to an embodiment of the present invention divides large-scale flushing 530 into small-scale flushing 540 in order to prevent the operating system from flushing too many dirty pages at once.

Figure 6:
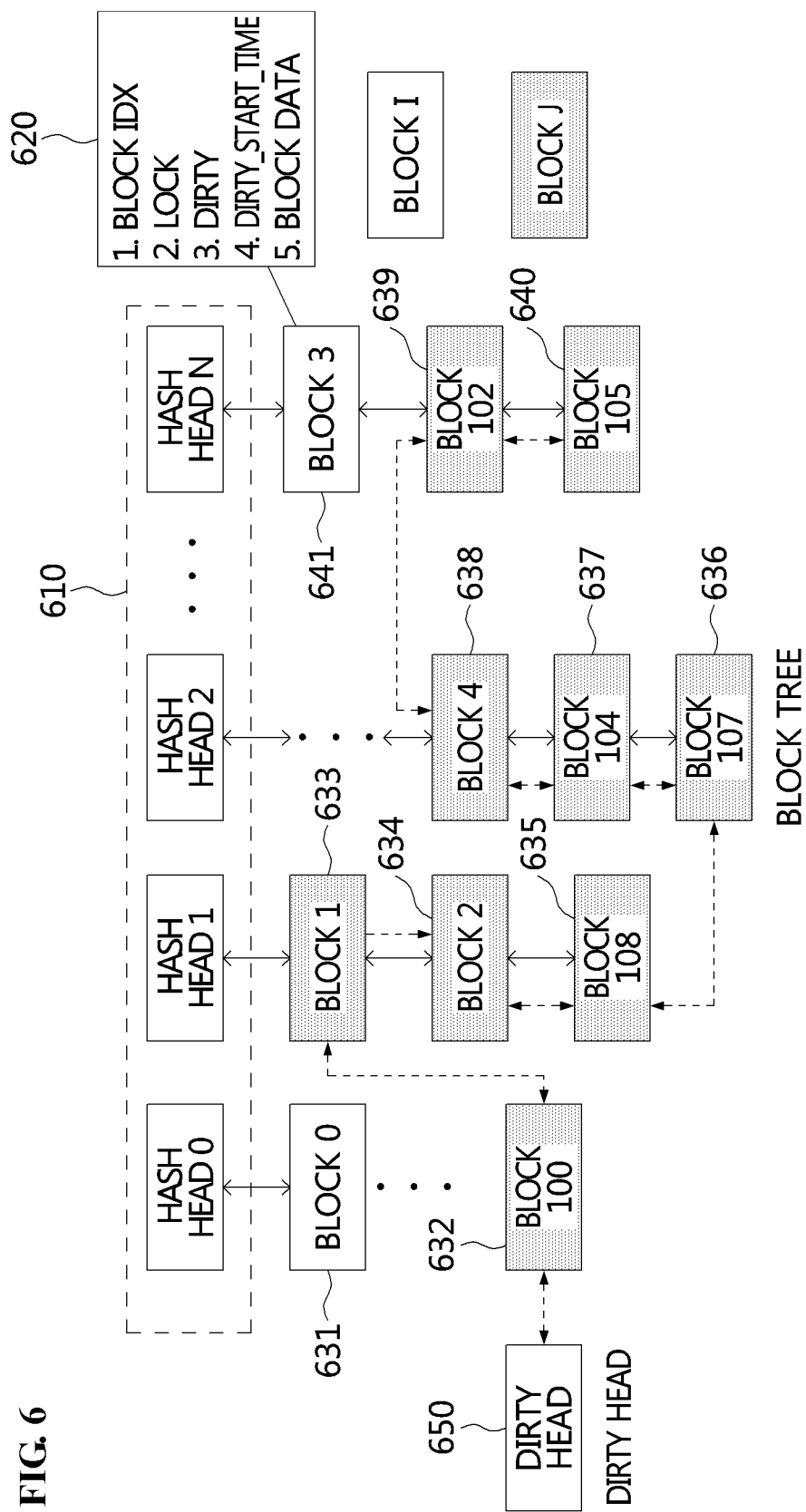
FIG. 6 is a view for explaining the structure of a block in a metadata server according to an embodiment of the present invention.

FIG. 6 is a view for explaining the structure of a block of a metadata server according to an embodiment of the present invention.

In order to enable a metadata server for processing user requests to quickly find a desired block, blocks having the same hash operation result based on the address (idx) thereof are connected to a hash head 610. For example, a first block 631 and a second block 632 are connected to Hash Head 0.

The structure 620 of each of the blocks 631 to 641 includes a block index for representing the address of a block, a lock field for concurrency control, and block data, and may further include a dirty field indicating that the corresponding block is not yet written to disk, and a dirty_start_time field for representing the time at which the dirty field is first set.

A dirty head 650, added in order to quickly search for dirty blocks, has links to all dirty blocks, whereby the metadata server 100 may quickly find targets to be flushed using the dirty head 650.

Figure 7:
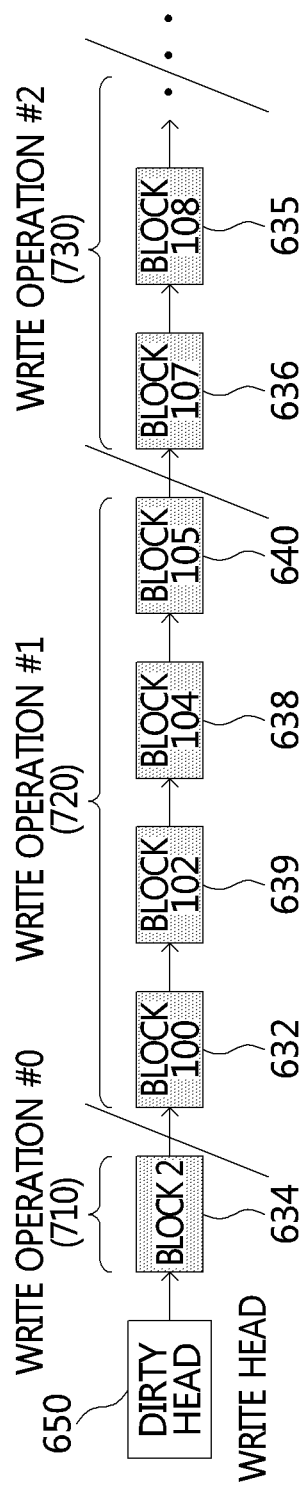
FIG. 7 is a view for explaining the process of writing data to a block according to an embodiment of the present invention.

FIG. 7 is a view that shows the process of dividing a unit of flushing into smaller units and performs flushing according to an embodiment of the present invention.

As shown in FIG. 7, all of the dirty blocks to be flushed are sorted by the index thereof in a write head, and are divided into multiple block groups 710, 720 and 730.

The criteria for dividing blocks into block groups may be at least one of the number of dirty blocks and the distance between the blocks. In FIG. 7, the maximum number of dirty blocks in the second block group 720 is four, and because 'block 2' 634 is far from 'block 100' 632, they are included in different block groups. If blocks far from each other are written to disk at once, it takes a lot of time for a disk head to search for blocks that are far from each other, which creates a low-speed processing section. Accordingly, blocks may be divided into block groups based on the distance between the blocks.

Figure 8:
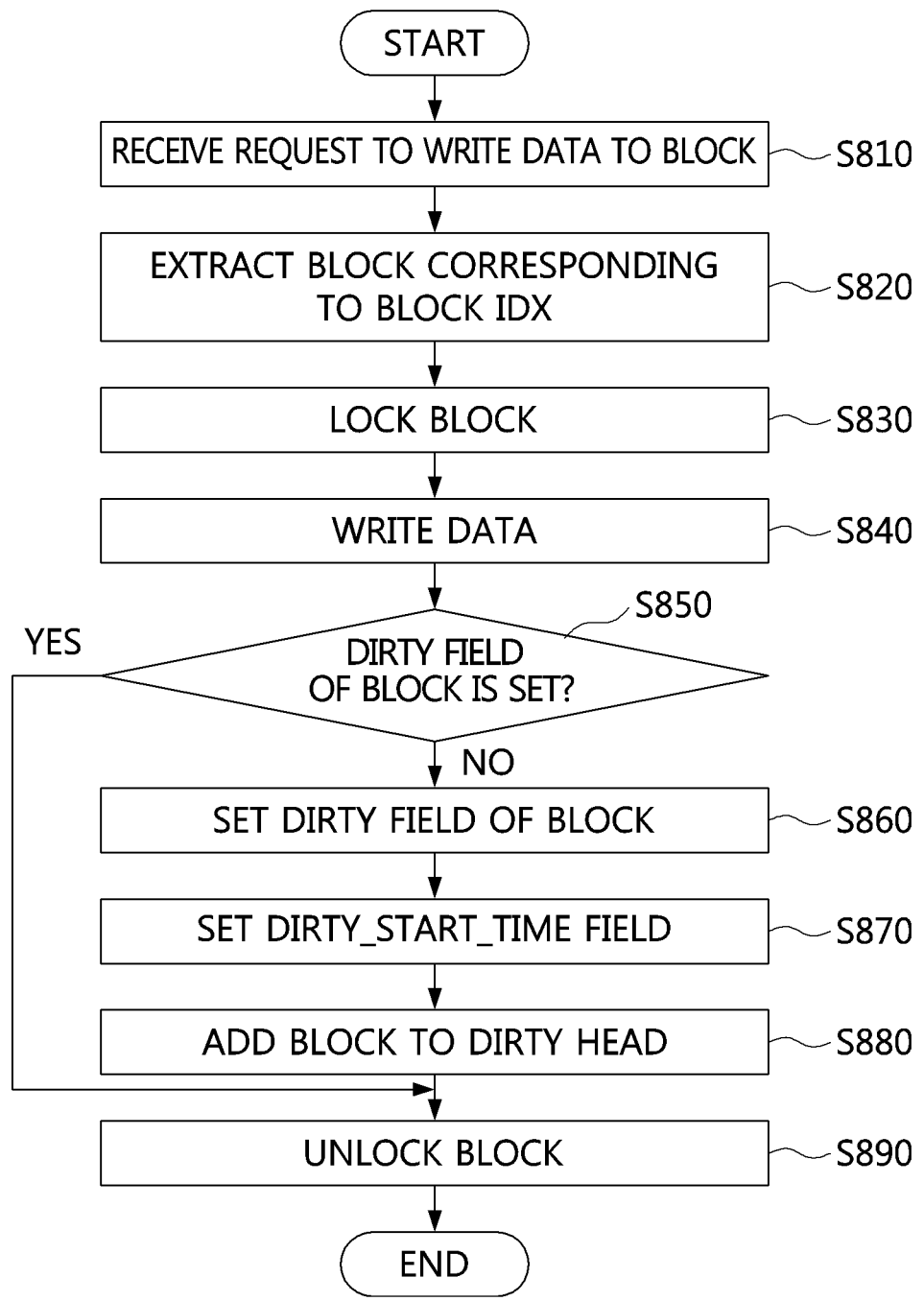
FIG. 8 is a flowchart for explaining a method for writing data to a block according to an embodiment of the present invention.

FIG. 8 is a flowchart for explaining a method for writing data to a block according to an embodiment of the present invention.

First, when it receives a request to write data to a block at step S810, the metadata server 100 extracts a block corresponding to a block index at step S820.

The metadata server 100 performs a hash operation based on a block address, selects a hash head based on the hash operation result, and extracts blocks that are connected to the hash head.

Then, the metadata server 100 acquires access permissions using the lock field of the block at step S830, and updates the write data to the data field of the block data at step S840.

Also, the metadata server 100 determines whether the value of the dirty field of the block is set at step S850. When it is determined that the value of the dirty field of the block is not set, the metadata server 100 sets the value of the dirty field at step S860. Also, the metadata server 100 sets the value of the dirty_start_time field at step S870, and adds the block to the dirty head at step S880.

Here, the metadata server 100 may set the value of the dirty field to 'dirty' and set the value of the dirty_start_time field to the current time.

Also, the metadata server 100 unlocks the block at step S890.

Here, when it is determined at step S850 that the value of the dirty field is already set to 'dirty', the block may be unlocked by immediately performing step S890.

Figure 9:
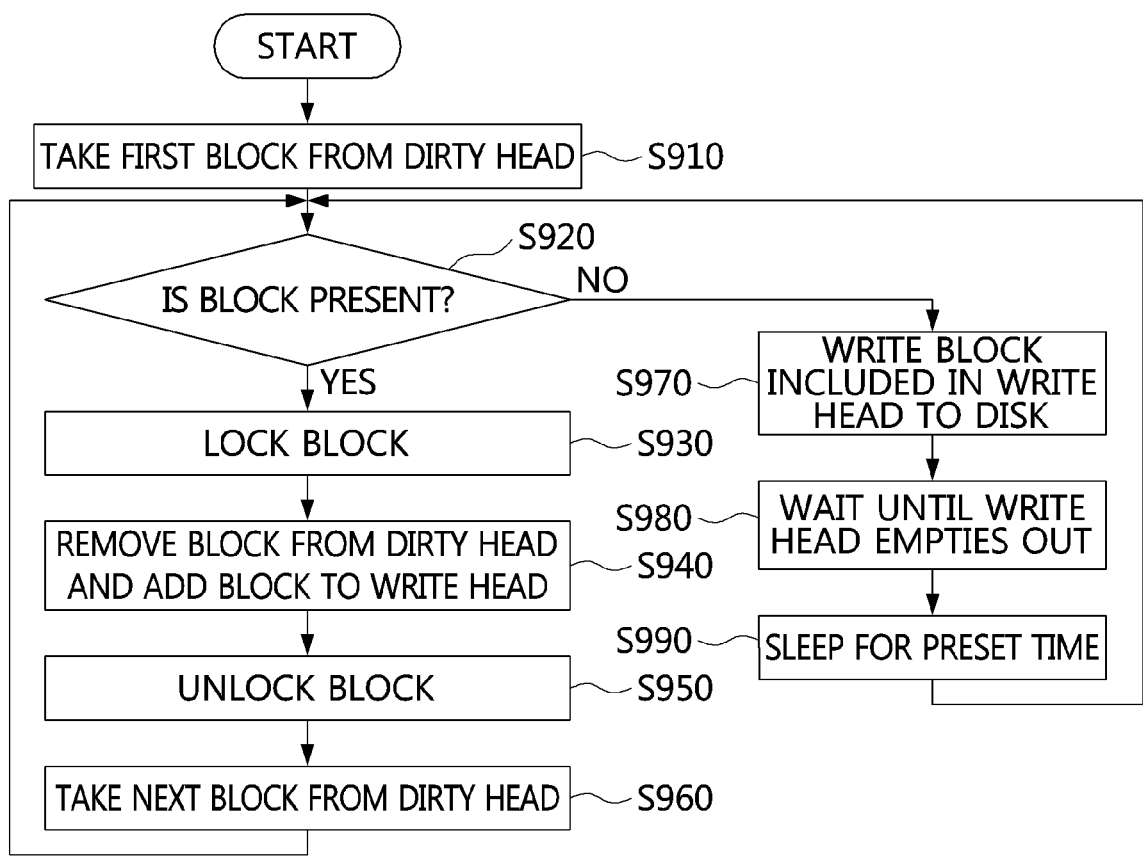
FIG. 9 is a flowchart for explaining a method for gradually flushing blocks according to an embodiment of the present invention.

FIG. 9 is a flowchart for explaining a method for gradually flushing blocks according to an embodiment of the present invention.

First, the metadata server 100 attempts to take a first block from the dirty head at step S910.

When it is determined at step S920 that a block is present, the metadata server 100 acquires access permissions by locking the block at step S930, removes the block from the dirty head, and adds the block to the write head at step S940. Then, the metadata server 100 unlocks the block at step S950, takes the next block from the dirty head at step S960, and again performs step S920.

That is, the metadata server 100 takes dirty blocks one by one from the dirty head to which the dirty blocks are connected, removes the dirty block therefrom, and adds the dirty block to the write head.

Meanwhile, when it is determined at step S920 that there is no dirty block, the metadata server 100 writes the blocks connected to the write head to disk at step 970 and waits until the write head empties out at step S980. Then, after sleeping for a preset time, the metadata server 100 performs step S920.

When all of the dirty blocks are removed from the dirty head and added to the write head, the metadata server 100 waits until all of the dirty blocks in the write head are flushed. After sleeping for the time taken to completely flush the dirty blocks (for example, 0.5 seconds), the metadata server 100 may repeat the process from the beginning.

Figure 10:
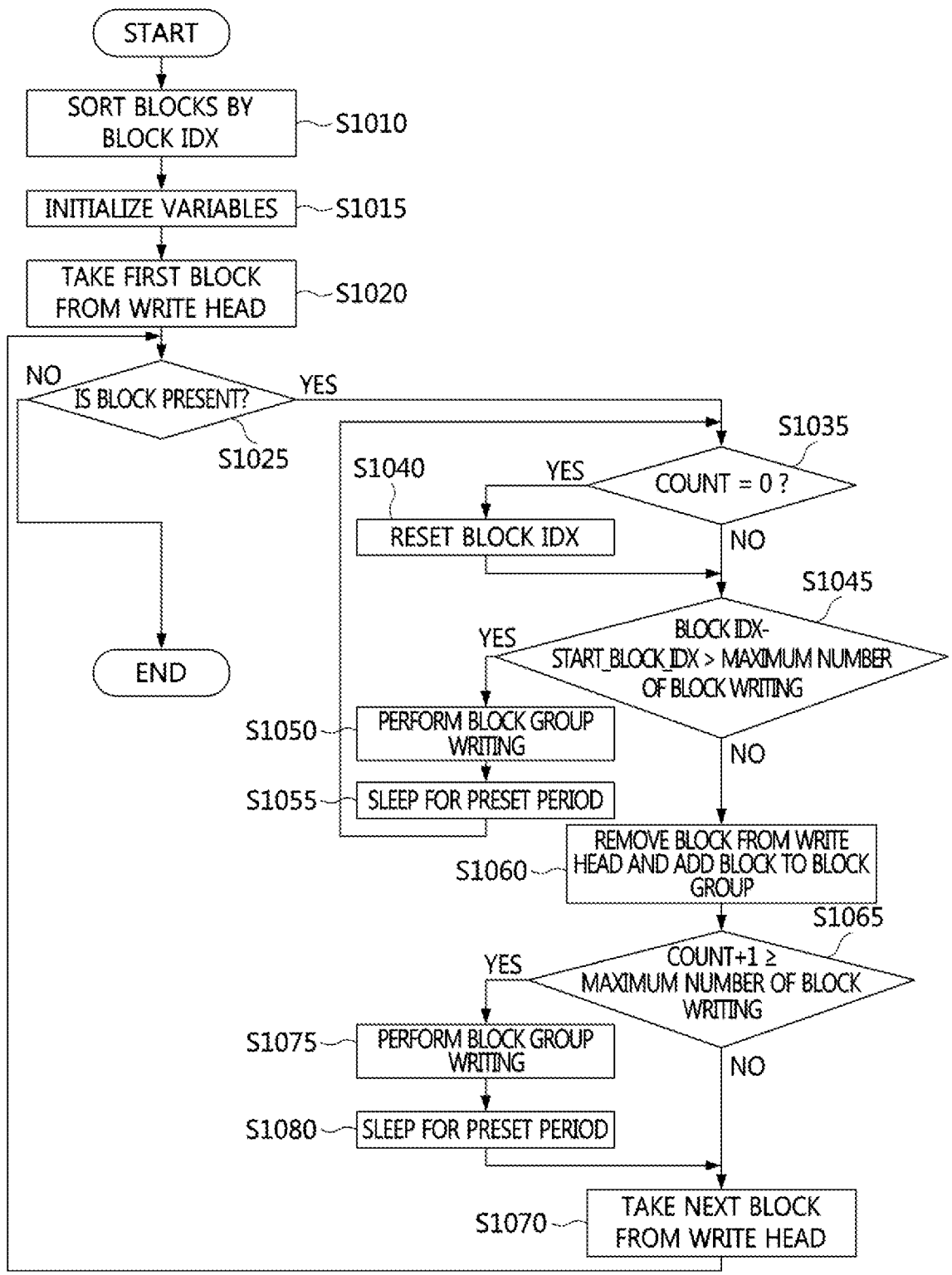
FIG. 10 is a flowchart for explaining a method for flushing blocks divided into groups according to an embodiment of the present invention.

FIG. 10 is a flowchart for explaining a method for dividing blocks into block groups and flushing the block groups according to an embodiment of the present invention.

In order to start to write blocks, the metadata server 100 sorts the blocks connected to the write head by a block index at step S1010.

Here, the metadata server 100 may sort the blocks in ascending order of block indices.

Also, the metadata server 100 initializes variables, such as a count, a start_block_idx, and a block group head, for each block group at step S1015.

The metadata server 100 attempts to take a first block from the write head at step S1020 and determines whether a block is present at step S1025. When it is determined that no block is present, the metadata server 100 terminates performing the flushing process of FIG. 10.

Conversely, when it is determined that a block is present, the metadata server 100 determines whether the value of the count is 0 at step S1035. When it is determined that the value of the count is 0, the metadata server 100 sets the value of start_block_idx to the index of the block at step S1040, and performs step S1045, which will be described later.

When it is determined that the value of the count is not 0, the metadata server 100 determines whether the difference between the index of the block and the value of start_block_idx is greater than the maximum number of block writing at step S1045.

Here, when the block is located far from the address of the first block in the block group, even though the difference between the index of the block and the value of start_block_idx is equal to or less than the maximum number of block writing, the metadata server 100 may put the block in another block group.

When the difference between the index of the block and the value of start_block_idx is greater than the maximum number of block writing, the metadata server 100 writes blocks included in the block group at step S1050, and sleeps for a preset time at step S1055.

The metadata server 100 sleeps, as shown in FIG. 9, after writing the blocks included in the block group, and may perform writing process after grouping the sorted dirty blocks into block groups. Then, the metadata server 100 may again perform step S1035.

Meanwhile, when the difference between the index of the block and the value of start_block_idx is less than the maximum number of block writing, the metadata server 100 locks the block, removes the block from the write head, adds the block to the block group, and unlocks the block at step S1060.

That is, the metadata server 100 includes, in the block group, as many blocks as the maximum number of block writing.

The metadata server 100 increases the value of the count by 1, and determines whether the value of the count is equal to or greater than the maximum number of block writing at step S1065.

When it is determined that the value of the count is equal to or greater than the maximum number of block writing, the metadata server 100 writes the blocks included in the block group at step S1075 and sleeps for a preset period at step S1080. Then, step S1070, which will be described later, is performed.

Conversely, when it is determined that the value of the count is less than the maximum number of block writing, the metadata server 100 takes the next block from the write head at step S1070 and repeatedly performs the process from step S1025.

Figure 11:
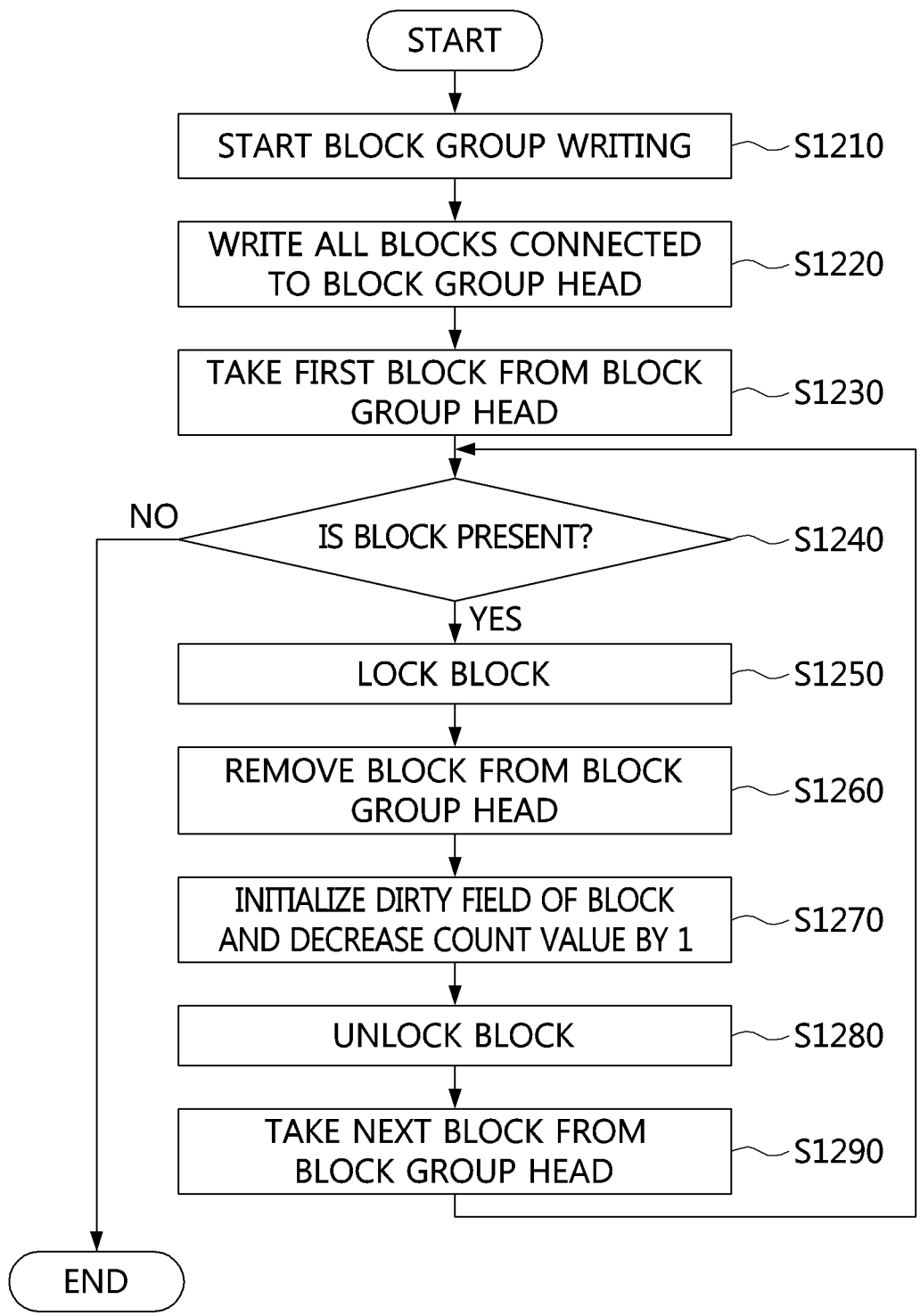
FIG. 11 is a flowchart for explaining a method for writing a block group to disk according to an embodiment of the present invention.

FIG. 11 is a flowchart for explaining a method for writing a block group according to an embodiment of the present invention.

When the block group writing is started at step S1210, the metadata server 100 writes all of the blocks connected to the block group head to disk at step S1220. Also, the metadata server 100 attempts to take a first block from the block group head at step S1230. When it is determined at step S1240 that a block is present, the metadata server 100 locks the block at step S1250.

The block is removed from the block group head at step S1260, the dirty field of the block is initialized, and the value of a count variable is decreased by 1 at step S1270. Also, the metadata server 100 unlocks the block at step S1280, takes the next block from the block group head at step S1290, and again performs the process after step S1240.

When it is determined at step S1240 that there is no block, the metadata server 100 may terminate the process of writing the blocks included in the block group to the disk.

Figure 12:
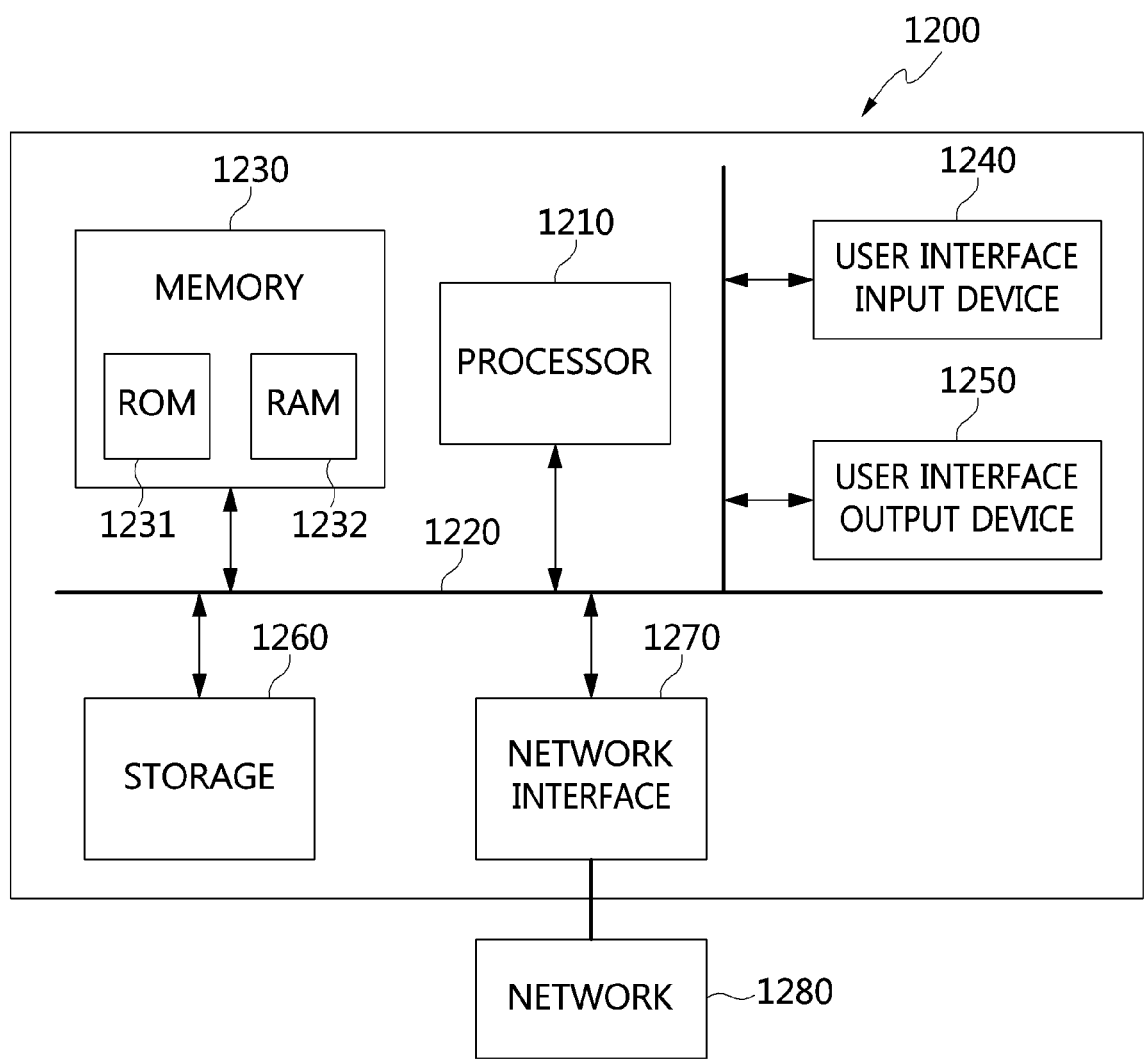
FIG. 12 is a block diagram that shows a computer system according to an embodiment of the present invention.

FIG. 12 is a block diagram that shows a computer system according to an embodiment of the present invention.

Referring to FIG. 12, an embodiment of the present invention may be implemented in a computer system 1200 including a computer-readable recording medium. As illustrated in FIG. 12, the computer system 1200 may include one or more processors 1210, memory 1230, a user interface input device 1240, a user interface output device 1250, and storage 1260, which communicate with each other via a bus 1220. Also, the computer system 1200 may further include a network interface 1270 connected to a network 1280. The processor 1210 may be a central processing unit or a semiconductor device for executing processing instructions stored in the memory 1230 or the storage 1260. The memory 1230 and the storage 1260 may be various types of volatile or nonvolatile storage media. For example, the memory may include ROM 1231 or RAM 1232.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, most user requests are processed in a single metadata server, whereby it is possible to secure performance and storage space scalability depending on the number of servers.

Also, according to the present invention, performance interference between servers is minimized, whereby ideal performance and scalability may be achieved.

Also, according to the present invention, the expense of installing a server may be reduced by securing required performance and storage space with fewer servers than an existing file system.

As described above, the metadata server and the method for distributing metadata in units of directories using the metadata server according to the present invention are not limitedly applied to the configurations and operations of the above-described embodiments, but all or some of the embodiments may be selectively combined and configured, so that the embodiments may be modified in various ways.

What is claimed is:

1. A method for distributing metadata in directories, which is performed by a metadata server, comprising:
receiving a request for at least one of creation, deletion, and retrieval of a file or a directory from a user file system;
acquiring an inode corresponding to an identifier of a parent inode, which is included in the request;
when the request is a request to create a directory, searching the parent inode for a dentry (directory entry) corresponding to the request;
selecting a secondary metadata server to which a new directory is to be assigned in order to distribute metadata in directories;
requesting the selected secondary metadata server to create an inode therein;
receiving an identifier of the created inode from the secondary metadata server; and
adding a new dentry to the parent inode using the identifier of the created inode.

2. The method of claim 1, further comprising:
when the request is not a request to create a directory, acquiring an address of the secondary metadata server and the identifier of the created inode from dentry information corresponding to the request.

3. The method of claim 2, further comprising:
when the request is a request to delete a directory, requesting the secondary metadata server to delete the acquired inode; and
deleting corresponding dentry information from the parent inode.

4. The method of claim 2, further comprising:
when the request is a request to search for a directory, requesting information about the acquired inode from the secondary metadata server and receiving the information about the acquired inode from the secondary metadata server.

5. The method of claim 1, further comprising:
when the request is a request for at least one of creation, deletion, and retrieval of a file, searching the parent inode for a dentry corresponding to the request.

6. The method of claim 5, further comprising:
when the request is a request to create a file, searching the parent inode for the dentry corresponding to the request;
when the dentry is not found, creating a new inode; and
adding a new dentry to the parent inode using an identifier of the new inode.

7. The method of claim 5, further comprising:
when the request is a request to delete a file and when the dentry is found, acquiring an inode corresponding to the dentry;
deleting the inode corresponding to the dentry; and
deleting the corresponding dentry from the parent inode.

8. The method of claim 5, further comprising:
when the request is a request to search for a file and when the dentry is found, acquiring an inode corresponding to the dentry; and
acquiring information about the inode corresponding to the dentry.

9. The method of claim 1, further comprising:
after acquiring the inode, determining whether the parent inode is present; and
when it is determined that the parent inode is not present, sending a failure message to the user file system.

10. The method of claim 1, further comprising:
when the dentry is found, sending a failure message to the user file system.

11. The method of claim 1, wherein the request includes at least one of a command, the identifier of the parent inode, and a file name.

12. The method of claim 1, wherein at least one of the metadata server and the secondary metadata server searches for a block corresponding to a user request using a block structure including a block index field, a lock field, a dirty field, a dirty start time field, and a block data field.

13. The method of claim 12, further comprising:
grouping all blocks to be flushed into multiple groups and gradually flushing the blocks.

14. The method of claim 13, wherein flushing the blocks is configured to perform flushing after grouping the blocks based on a maximum number of blocks to be included in each group or based on a distance between blocks.

15. The method of claim 13, wherein flushing the blocks is configured to repeatedly perform:
extracting dirty blocks one by one from a dirty head to which the dirty blocks are connected,
removing the extracted block from the dirty head and adding the removed block to a write head, and
waiting for a preset time until the blocks included in the write head are flushed.

16. A metadata server, comprising:
a processor; and
a non-volatile storage medium with computer-readable instructions stored thereon which, when executed by the processor, perform the following steps:
receiving a request for at least one of creation, deletion, and retrieval of a file or a directory from a user file system;
acquiring an inode corresponding to an identifier of a parent inode, which is included in the request;

determining whether the request is in regard to a file or a directory;

searching for a dentry corresponding to the request, creating a new inode or searching for or deleting an inode corresponding to the dentry when the request is in regard to a file, and processing the request using a secondary metadata server to which metadata are distributed in directories when the request is in regard to a directory; and adding a new dentry to the parent inode or deleting the inode corresponding to the dentry from the parent inode based on a result of processing the request.

17. The metadata server of claim 16, wherein the steps further comprise adding the new dentry to the parent inode corresponding to the request or search for or delete the inode corresponding to the request when the request is a request for any one of creation, deletion, and retrieval of a file.

18. The metadata server of claim 16, wherein the steps further comprise creating an inode in the secondary metadata server or retrieve or delete an inode from the secondary metadata server so as to respond to the request when the request is a request for any one of creation, deletion, and retrieval of a directory.

19. A metadata server, comprising:

a processor; and a non-volatile storage medium with computer-readable instructions stored thereon which, when executed by the processor, perform the following steps:

searching for a block corresponding to a user request using a block structure including a block index field, a lock field, a dirty field, a dirty start time field, and a block data field;

grouping all blocks to be flushed based on at least one of a maximum number of blocks to be included in each group and a distance between blocks; and gradually flushing the grouped blocks.

20. The metadata server of claim 19, wherein flushing the group blocks comprises repeatedly extracting dirty blocks one by one from a dirty head to which the dirty blocks are connected, removing the extracted block from the dirty head, adding the removed block to a write head, and waiting for a preset time until the blocks included in the write head are flushed.

* * * * *